United States Patent
Almasoud

(10) Patent No.: US 9,834,306 B2
(45) Date of Patent: Dec. 5, 2017

(54) EMERGENCY UNMANNED AERIAL VEHICLE AND METHOD FOR DEPLOYING AN UNMANNED AERIAL VEHICLE

(71) Applicant: Abdullah Almasoud, Ames, IA (US)

(72) Inventor: Abdullah Almasoud, Ames, IA (US)

( * ) Notice: Subject to any disclaimer, the term of this patent is extended or adjusted under 35 U.S.C. 154(b) by 95 days.

(21) Appl. No.: 15/019,551

(22) Filed: Feb. 9, 2016

(65) Prior Publication Data

US 2017/0225781 A1    Aug. 10, 2017

(51) Int. Cl.
| | |
|---|---|
| *B64C 39/02* | (2006.01) |
| *G07C 5/08* | (2006.01) |
| *G08G 5/00* | (2006.01) |
| *H04B 7/185* | (2006.01) |

(52) U.S. Cl.
CPC .............. *B64C 39/024* (2013.01); *G07C 5/08* (2013.01); *G08G 5/0069* (2013.01); *H04B 7/18506* (2013.01); *B64C 2201/024* (2013.01); *B64C 2201/066* (2013.01); *B64C 2201/108* (2013.01); *B64C 2201/12* (2013.01); *B64C 2201/20* (2013.01)

(58) Field of Classification Search
CPC .................................................. B64C 39/024
See application file for complete search history.

(56) References Cited

U.S. PATENT DOCUMENTS

| | | | |
|---|---|---|---|
| 6,556,981 B2 | 4/2003 | Pedersen et al. | |
| 8,909,391 B1 * | 12/2014 | Peeters ................. | G05D 1/0027 701/2 |
| 2008/0215204 A1 * | 9/2008 | Roy ...................... | G05D 1/0044 701/28 |
| 2008/0306680 A1 * | 12/2008 | Marty .................... | G01C 21/00 701/533 |

(Continued)

OTHER PUBLICATIONS

Svilen K., "Victims deploy drone that live streams video to authorities and alerts locals of emergency", https://openideo.com/challenge/usaid-humanity-united/ideas/victims-deploy-droid-that-live-streams-video-to-authorities-and-alerts-locals-of-emergency.-, Mar. 30, 2013, 6 pages.

(Continued)

*Primary Examiner* — Truc M Do
(74) *Attorney, Agent, or Firm* — Oblon, McClelland, Maier & Neustadt, L.L.P.

(57) ABSTRACT

An emergency unmanned aerial vehicle (UAV) and a method for employing a UAV. The method includes storing a digital elevation model (DEM) and associated data including locations of communication networks, updating the locations of communication networks in the associated data via a wireless transceiver, and storing position information determined by a global navigation satellite system (GNSS) receiver. The method includes detecting a predetermined condition using electronic sensors, determining whether the UAV is within a communications range of any communication network via the wireless transceiver, and determining (Continued)

a path to a communication network using the DEM and the associated data. The method also includes causing the UAV to become airborne and fly along the path, and transmitting a distress message via the wireless transceiver to the communication network, the distress message including position information corresponding to a location where the UAV detected the predetermined condition.

19 Claims, 9 Drawing Sheets

(56) References Cited

U.S. PATENT DOCUMENTS

| | | | | |
|---|---|---|---|---|
| 2009/0073034 | A1* | 3/2009 | Lin | G01S 19/49 342/357.32 |
| 2010/0305782 | A1* | 12/2010 | Linden | G01C 11/025 701/3 |
| 2011/0130636 | A1* | 6/2011 | Daniel | G08B 25/016 600/301 |
| 2011/0137547 | A1* | 6/2011 | Kwon | G01C 11/02 701/532 |
| 2014/0172357 | A1* | 6/2014 | Heinonen | G01C 21/005 702/150 |
| 2014/0316616 | A1* | 10/2014 | Kugelmass | G05D 1/101 701/8 |
| 2015/0153740 | A1* | 6/2015 | Ben-Shachar | G05D 1/0676 701/16 |
| 2016/0299506 | A1* | 10/2016 | Bruggeman | B64D 31/06 |
| 2016/0347462 | A1* | 12/2016 | Clark | B64D 17/62 |
| 2016/0363929 | A1* | 12/2016 | Clark | G05D 1/0011 |

OTHER PUBLICATIONS

"Sensors & Software", http://www.uasusa.com/products-services/payload-systems, 3 pages.

"Emergency Search and Rescue, Fire, Flood, Earthquake, Avalanche & More", http://www.uasusa.com/applications/emergency, 3 pages.

"Skycatch", https://www.skycatch.com/get-skycatch, 2 pages.

"Short Range Low Altitude", https://www.skycatch.com/technology/short-range, 2 pages.

"Data Analysis Tools", https://www.skycatch.com/technology/dashboard, 2 pages.

* cited by examiner

EMERGENCY UNMANNED AERIAL VEHICLE AND METHOD FOR DEPLOYING AN UNMANNED AERIAL VEHICLE

BACKGROUND

Field of the Disclosure

The present disclosure relates to unmanned aerial vehicles (UAVs), and particularly relates to UAVs which deploy in an emergency.

Description of Related Art

Various types of work and recreational activities can result in travel into or across sparsely populated areas. If there is an emergency while a traveler is in a sparsely populated area and the traveler requires assistance, the traveler may not be able to alert anyone if they are not in a location in which a wireless communications device can connect to a communication network. Further, for emergencies which result in a partial or total incapacitation of the traveler, the traveler may be unable to place an emergency call even if they are within a communication network coverage area.

Also, in many areas of the world or times of the year a traveler can be exposed to dangerous elements, such as extreme heat or cold, in the event of a vehicle failure. In these environments, it can be very unsafe for the traveler to attempt to reach safety or find a location from which an emergency call or signal can be transmitted. In such cases, it is preferable in the short term for the traveler to attempt to shelter in place using the vehicle; however, if the vehicle is not within a communication network coverage area the traveler may have no way to alert anyone that they are in need of assistance. The traveler is then left with a choice of taking the risk of trying to locate assistance in the dangerous environment, or simply waiting for assistance which may not arrive in time.

Thus, there is a need to be able to transmit an emergency call or signal for assistance where a traveler is unable to make a wireless call, whether due to a lack of wireless coverage or an incapacity of the traveler. Further, this should be achievable without direct action by the traveler, if necessary.

SUMMARY

An embodiment of the disclosure is drawn to an emergency unmanned aerial vehicle (UAV). The UAV includes a wireless transceiver configured to receive and transmit wireless communications, an inertial measurement unit (IMU) configured with at least one of a three-axis accelerometer, a three-axis gyroscope, and a microelectromechanical magnetometer, and a global navigation satellite system (GNSS) receiver configured to receive position information via an antenna and determine a position of the UAV.

Circuitry is configured to store a digital elevation model (DEM) and associated data including locations of communication networks. The locations of communication networks are updated in the associated data via the wireless transceiver, and position information determined by the GNSS receiver is stored. The circuitry detects a predetermined condition, and determines, using at least one of the DEM and the associated data, whether the UAV is within a communications range of any communication network via the wireless transceiver. The circuitry determines a path to a communication network using the DEM and the associated data, causes the UAV to become airborne and fly along the path to the communication network in response to detecting the predetermined condition, and transmits a distress message via the wireless transceiver to the communication network, the distress message including position information corresponding to a location where the UAV detected the predetermined condition.

Another embodiment of the disclosure is drawn to a method for employing an emergency unmanned aerial vehicle (UAV). The method includes storing a digital elevation model (DEM) and associated data, the associated data including locations of communication networks in on-board circuitry including a memory, and updating the locations of communication networks in the associated data to the DEM via a wireless transceiver configured to receive and transmit wireless communications, and storing position information determined by a global navigation satellite system (GNSS) receiver, configured to receive position information via an antenna and determine a position of the UAV.

The method includes detecting a predetermined condition using electronic sensors, determining whether the UAV is within a communications range of any communication network via the wireless transceiver, and determining a path to a communication network using the DEM and the associated data. The method also includes causing the UAV to become airborne and fly along the path to the communication network in response to detecting the predetermined condition, and transmitting a distress message via the wireless transceiver to the communication network, the distress message including position information corresponding to a location where the UAV detected the predetermined condition.

Another embodiment of the disclosure is drawn to a non-transitory computer readable medium having program instructions stored therein for causing a processor to perform a method for employing an emergency unmanned aerial vehicle (UAV). The method includes storing a digital elevation model (DEM) and associated data, the associated data including locations of communication networks in on-board circuitry including a memory, and updating the locations of communication networks in the associated data to the DEM via a wireless transceiver configured to receive and transmit wireless communications, and storing position information determined by a global navigation satellite system (GNSS) receiver, configured to receive position information via an antenna and determine a position of the UAV.

The method includes detecting a predetermined condition using electronic sensors, determining whether the UAV is within a communications range of any communication network via the wireless transceiver, and determining a path to a communication network using the DEM and the associated data. The method also includes causing the UAV to become airborne and fly along the path to the communication network in response to detecting the predetermined condition, and transmitting a distress message via the wireless transceiver to the communication network, the distress message including position information corresponding to a location where the UAV detected the predetermined condition.

BRIEF DESCRIPTION OF THE DRAWINGS

A more complete appreciation of the disclosed embodiments and many of the attendant advantages thereof will be more readily obtained by reference to the accompanying drawings when considered in connection with following detailed description.

DETAILED DESCRIPTION

Figure 1A:
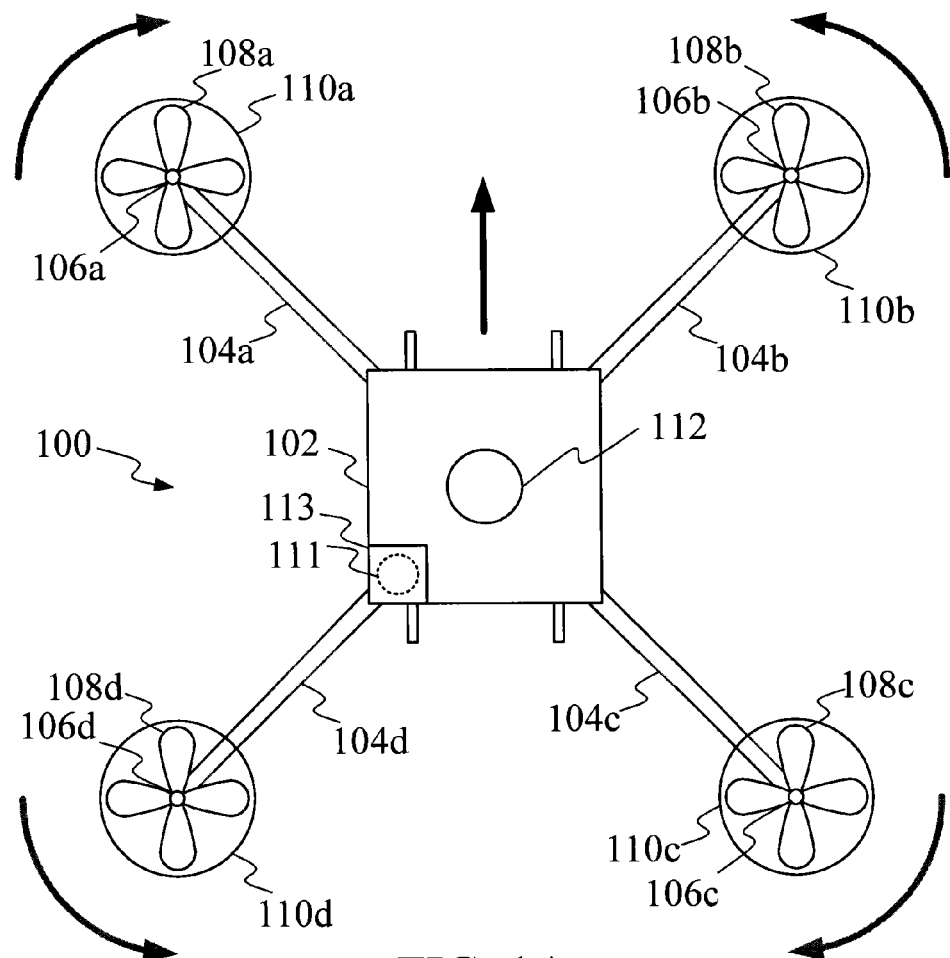
FIG. 1A illustrates a top view of an emergency UAV according to an embodiment of the disclosure.

In the present disclosure, the terms communication network, wireless network, and wireless communication network are used interchangeably to describe a network for communicating wirelessly with wireless transceiver, and may include the transmission and receipt of voice and data by various cellular, internet, Wi-Fi, Radio Frequency (RF), and satellite communication methods. Further, references of physical proximity of a UAV to a communication network, such as the UAV flying to a communication network, indicate the UAV is traveling to within a range of the communication network to wirelessly communicate via a wireless transceiver, with the communication network, rather than to a specific or exact location.

The following descriptions are meant to further clarify the present disclosure by giving specific examples and embodiments of the disclosure. These embodiments are meant to be illustrative rather than exhaustive. The full scope of the disclosure is not limited to any particular embodiment disclosed in this specification, but rather is defined by the claims.

An embodiment of the disclosure is drawn to an emergency unmanned aerial vehicle (UAV). The UAV includes a wireless transceiver configured to receive and transmit wireless communications, an inertial measurement unit (IMU) configured with at least one of a three-axis accelerometer, a three-axis gyroscope, and a microelectromechanical magnetometer, and a global navigation satellite system (GNSS) receiver configured to receive position information via an antenna and determine a position of the UAV.

Circuitry is configured to store a digital elevation model (DEM) and associated data including locations of communication networks. The locations of communication networks are updated in the associated data via the wireless transceiver, and position information determined by the GNSS receiver is stored. The circuitry detects a predetermined condition, and determines, using at least one of the DEM and the associated data, whether the UAV is within a communications range of any communication network via the wireless transceiver. The circuitry determines a path to a communication network using the DEM and the associated data, causes the UAV to become airborne and fly along the path to the communication network in response to detecting the predetermined condition, and transmits a distress message via the wireless transceiver to the communication network, the distress message including position information corresponding to a location where the UAV detected the predetermined condition.

In an aspect of the disclosure, the circuitry is further configured to determine an acceleration of the UAV via the IMU prior to the UAV becoming airborne. The predetermined condition is detected when the determined acceleration exceeds a predetermined acceleration.

In an aspect of the disclosure, emergency UAV includes a solar panel configured to charge the battery.

In an aspect of the disclosure, the circuitry determines the path to the communication network using an optimal path algorithm.

In an aspect of the disclosure, the circuitry is further configured to store and update environmental data via the wireless transceiver, the environmental data being included in the associated data.

In an aspect of the disclosure, the circuitry is further configured to periodically determine whether a communication network is available prior to the UAV becoming airborne, and periodically obtain the locations of the communication networks and the environmental data via an available communication network when it is determined that the communication network is available.

In an aspect of the disclosure, the emergency UAV is configured to couple to a docking station on a vehicle, and to charge a battery provided in the UAV from the vehicle when coupled to the docking station on the vehicle.

In an aspect of the disclosure, the circuitry is further configured to receive sensor information from the vehicle. Detecting the predetermined condition includes detecting the predetermined condition in the received sensor information from the vehicle.

In an aspect of the disclosure, the sensor information from the vehicle includes at least one of a fuel level of the vehicle, a battery charge state of the vehicle, and a tilt angle of the vehicle.

In an aspect of the disclosure, the associated data includes locations of charging stations, and the emergency UAV is configured to couple to a charging station and receive charge from the charging station.

In an aspect of the disclosure, the circuitry is further configured to cause the emergency UAV to wait a predetermined period of time after detecting the predetermined condition before causing the UAV to fly along the path to the communication network or transmitting the distress message. The circuitry can receive a signal canceling the detection of the predetermined condition via the wireless transceiver within the predetermined period of time, and cause the emergency UAV to return to a stand-by location when the signal canceling the activation is received within the predetermined period of time.

In an aspect of the disclosure, the emergency UAV is configured to be folded and stored in a portable pack.

In an aspect of the disclosure, the wireless transceiver is further configured as a multiband transceiver including direct radio communications capability.

In an aspect of the disclosure, the emergency UAV further includes an ultrasonic rangefinder. The circuitry is configured to land the UAV when a charge of the battery decreases to a predetermined threshold charge after the UAV becomes airborne. The circuitry uses the ultrasonic rangefinder to verify a distance to the ground, monitors a charge of the battery, and reactivates the UAV when the battery reaches a predetermined charge level.

In an aspect of the disclosure, the DEM and associated data indicate geographical regions where the UAV is not allowed to fly, and the circuitry determines the path to the communication network avoiding the indicated regions where the UAV is not allowed to fly.

In an aspect of the disclosure, the circuitry is further configured to transmit the distress message via the wireless transceiver to a second emergency UAV.

In an aspect of the disclosure, the circuitry is further configured to receive an external distress message via the wireless transceiver prior to the UAV becoming airborne. The detecting the predetermined condition includes receiving the external distress message via the wireless transceiver.

In an aspect of the disclosure, the circuitry is further configured to cause the emergency UAV to return to a stand-by location after the UAV transmits the distress message to the communication network. The stand-by location is a pre-programmed location or a location where the UAV became airborne.

Another embodiment of the disclosure is drawn to a method for employing an emergency unmanned aerial vehicle (UAV). The method includes storing a digital elevation model (DEM) and associated data, the associated data including locations of communication networks in on-board circuitry including a memory, updating the locations of communication networks in the associated data to the DEM via a wireless transceiver configured to receive and transmit wireless communications, and storing position information determined by a global navigation satellite system (GNSS) receiver, configured to receive position information via an antenna and determine a position of the UAV.

The method includes detecting a predetermined condition using electronic sensors, determining whether the UAV is within a communications range of any communication network via the wireless transceiver, and determining a path to a communication network using the DEM and the associated data. The method also includes causing the UAV to become airborne and fly along the path to the communication network in response to detecting the predetermined condition, and transmitting a distress message via the wireless transceiver to the communication network, the distress message including position information corresponding to a location where the UAV detected the predetermined condition.

Another embodiment of the disclosure is drawn to a non-transitory computer readable medium having program instructions stored therein for causing a processor to perform a method for employing an emergency unmanned aerial vehicle (UAV). The method includes storing a digital elevation model (DEM) and associated data, the associated data including locations of communication networks in on-board circuitry including a memory, updating the locations of communication networks in the associated data to the DEM via a wireless transceiver configured to receive and transmit wireless communications, and storing position information determined by a global navigation satellite system (GNSS) receiver, configured to receive position information via an antenna and determine a position of the UAV.

The method includes detecting a predetermined condition using electronic sensors, determining whether the UAV is within a communications range of any communication network via the wireless transceiver, and determining a path to a communication network using the DEM and the associated data. The method also includes causing the UAV to become airborne and fly along the path to the communication network in response to detecting the predetermined condition, and transmitting a distress message via the wireless transceiver to the communication network, the distress message including position information corresponding to a location where the UAV detected the predetermined condition.

In an embodiment of the disclosure, FIG. 1A illustrates a top view of an emergency UAV 100. The emergency UAV 100 includes a lightweight chassis 102 and four fixed-pitch rotors 108a, 108b, 108c, and 108d. In present disclosure, a plurality of components having a same functionality is given a common number, for example, rotors 108, and specific components in the plurality are indicated by a letter appended to the common number, for example, rotor 108a refers to a specific rotor. A reference to the common number without a letter, for example, rotors 108, indicates that the statement regards the entire plurality, i.e., 108a, 108b, 108c, and 108d.

The rotors 108a, 108b, 108c, and 108d are driven by electric motors 106a, 106b, 106c, and 106d, respectively. The electric motors 106 and rotors 108 are configured in counter-rotating pairs, with a direction of rotation as indicated by the curved arrows in FIG. 1A.

A rotational speed of each of the electric motors 106 can be independently adjusted. The independent variation of the speed of the electric motors 106 controls the motion of the UAV 100. Balanced power, i.e., power applied equally to each of the electric motors 106, results in a net force upward or downward on the UAV 100, with no forward or backward motion, left or right motion, or turning torques about the UAV's center of mass. Unbalanced power, i.e., power applied unequally to the electric motors 106, produces forward or backward motion, left or right motion, or a turning torque about the UAV's center of mass, depending on how the power is unequally applied.

For example, let the straight arrow in FIG. 1A indicate a forward direction for the UAV 100. Increasing power to the electric motors 106b and 106c will cause the rotors 108b and 108c to spin faster, generating more lift on the right side of the UAV 100. The increased lift on the right side of the UAV 100 will cause the UAV to tilt and move to the left. Correspondingly, increasing power to the electric motors 106a and 106d will cause the rotors 108a and 108d to spin faster, generating more lift on the left side of the UAV 100. The increased lift on the left side of the UAV 100 will cause the UAV to tilt and move to the right.

Similarly, increasing power to the electric motors 106a and 106b will cause the rotors 108a and 108b to spin faster, generating more lift on a front side of the UAV 100. The increased lift on the front side of the UAV 100 will cause the UAV to move backward. Similarly, increasing power to the electric motors 106c and 106d will cause the rotors 108c and 108d to spin faster, generating more lift on the back side of the UAV 100. The increased lift on the back side of the UAV 100 will cause the UAV to tilt and move forward.

A net torque without a change in net lift of the UAV 100 can be produced by an increase and offsetting decrease in power between counter-rotating pairs of motors 106 so as to result in no net change in lift. For example, an increase in power to electric motors 106a and 106c with a corresponding decrease in power to electric motors 106b and 106d will produce a counter-clockwise rotation of the UAV 100, as viewed from above. Similarly, an increase in power to electric motors 106b and 106d with a corresponding decrease in power to electric motors 106a and 106c will produce a clockwise rotation of the UAV 100, as viewed from above.

Thus, the variable power applied to each electric motor 106 determines the rotational speed of the electric motor, and varying the speed of the electric motors 106 produces a desired total thrust on the UAV 100, as well as creating any desired turning forces for roll, pitch, and yaw control. More complicated motions are achieved through combinations of the actions described above. Control of the motion of the UAV 100 is achieved through simple changes in the speed of the rotors 108.

The rotors 108a, 108b, 108c, and 108d are protected by rotor guards 110a, 110b, 110c, and 110d, respectively, which protect the rotors 108 in a case of potential contact or impact with another object. The rotors 108 and rotor guards 110 are rigidly fixed to arms 104. Each of the arms 104a, 104b, 104c, and 104d is fixed to the chassis 102, so that the arms 104 provide stability for the electric motors 106a, 106b, 106c, and 106d, respectively, and the UAV 100 can be maneuvered via net forces and torques due to the four rotors 108.

An antenna 112 is provided on the emergency UAV 100. The multi-band antenna 112 includes a global navigation satellite system (GNSS) antenna, and one or more antennas configured for communications with wireless networks and for communications directly with other devices. Signals are passed between the antenna 112 and the corresponding circuitry of the emergency UAV to achieve two-way communications and receive GNSS signals.

A hinged cover 113 protects a manual deployment button 111. The manual deployment button 111 allows the UAV 100 to be deployed by a user without any of the other triggering conditions having been met. The triggering conditions for deploying the emergency UAV 100 are discussed in more detail below.

Figure 1B:
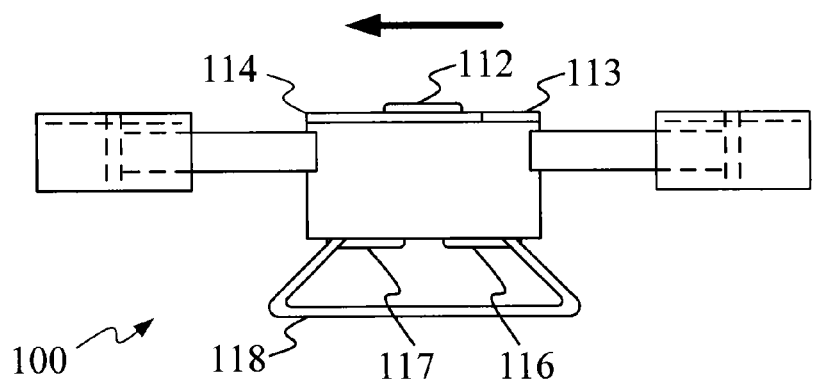
FIG. 1B illustrates a side view of the emergency UAV in FIG. 1A.

FIG. 1B illustrates a side view of the emergency UAV in FIG. 1A. The arrow depicted above the emergency UAV 100 indicates the forward direction. The portions of the top of the emergency UAV not covered by the antenna 112 and the hinged cover 113 are covered by a solar panel 114 on a top of the UAV 100 for recharging the UAV 100.

An ultrasonic rangefinder 116 is located on the bottom of the UAV 100. The ultrasonic rangefinder 116 is used by the UAV 100 while in flight for determining an altitude of the UAV 100. The ultrasonic rangefinder 116 is configured to emit an ultrasonic sound wave pulse, and detect a return of the reflected sound wave pulse. The ultrasonic rangefinder 116 outputs a voltage signal corresponding to the detected reflected sound wave, which is processed by circuitry in the UAV to determine the altitude of the UAV above ground level (AGL). A pair of landing struts 118 on the bottom of the UAV 100 allows the UAV to land, and provide a stable base for the UAV while the UAV is on the ground.

An external connector 117 is located on the bottom of the emergency UAV 100. The external connector 117 allows the emergency UAV 100 to physically couple to an external device. The external connector 117 is configured to receive input from one or more external sensors, and also configured to receive a current for recharging the UAV.

Figure 1C:
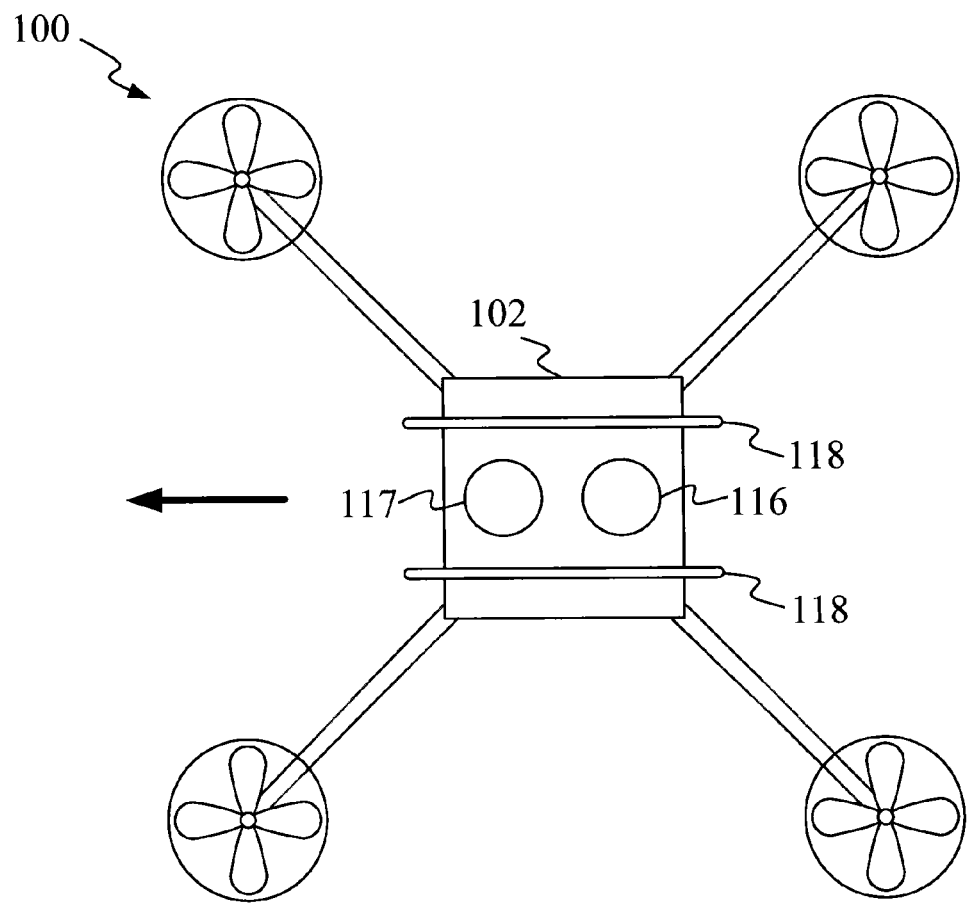
FIG. 1C illustrates a bottom view of the emergency UAV in FIG. 1A.

FIG. 1C illustrates a bottom view of the emergency UAV in FIG. 1A. The arrow in the FIG. 1C indicates the forward direction of the emergency UAV. The external connector 117 and the ultrasonic rangefinder 116 are located on the bottom of the chassis 102 of the emergency UAV, protected by the two landing struts 118. The external connector 117 and the ultrasonic rangefinder 116 remain unobstructed under the emergency UAV, so that the ultrasonic rangefinder 116 can accurately determine the distance to the ground and the external connector 117 can mate with a connector on an external device.

The external device can be, for example, a vehicle configured to accept the emergency UAV, or a docking device configured to accept the emergency UAV. The external connector 117 then allows the processor 120 to communicate with sensors on the vehicle. Communication with sensors on board the vehicle allows the emergency UAV 100 to deploy based on predetermined conditions which are detected by the UAV via the vehicle sensors. For example, a fuel level sensor in the vehicle can send a fuel level reading to the emergency UAV 100. When the fuel level reaches a predetermined minimum reading, the emergency UAV 100 deploys. Or, in an electric vehicle, a battery sensor can send a state of charge reading to the emergency UAV 100. When a predetermined minimum battery state of charge is reached, the emergency UAV 100 deploys.

The emergency UAV is configured to draw a charge from the external device via the external connector 117, ensuring that the UAV is fully charged in the event of an emergency. The external device can also include a dedicated charging station. In such an application, dedicated charging stations are configured to charge the emergency UAV 100 via the external connector 117 and pre-staged in areas where the emergency UAV is to be utilized. A location of such pre-staged charging stations is stored in a memory of the emergency UAV, and a path of the emergency UAV 100 after deployment is determined using the locations of the pre-staged charging stations stored in memory.

Figure 2:
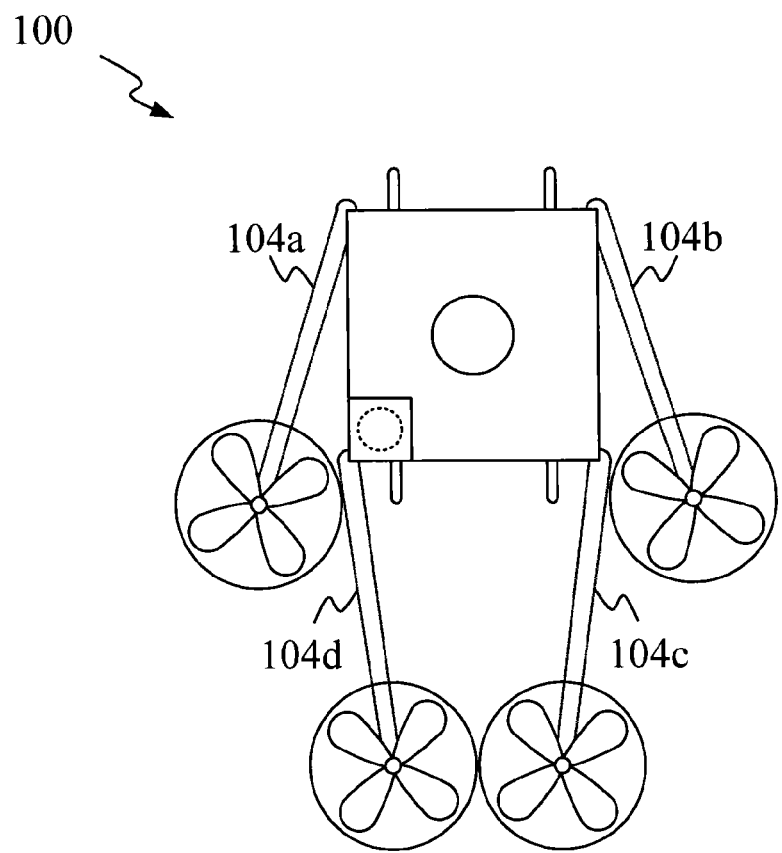
FIG. 2 illustrates the emergency UAV in FIG. 1A in a folded configuration.

FIG. 2 illustrates the emergency UAV 100 in a folded configuration. The arms 104 of the emergency UAV 100 can be folded back, so as to make the UAV portable. In the folded configuration, the emergency UAV 100 can be stowed in a container or carried in a pack.

Figure 3:
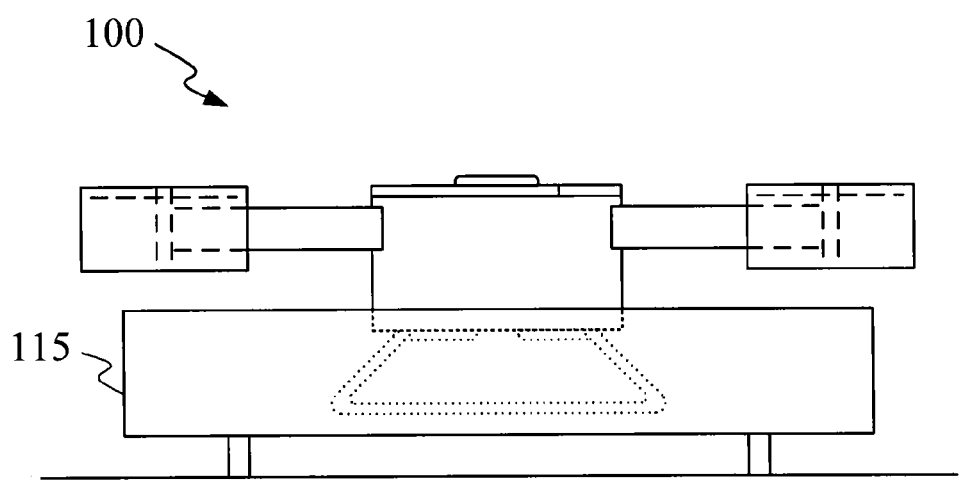
FIG. 3 illustrates the emergency UAV docked in a docking station.

FIG. 3 illustrates the emergency UAV 100 illustrated in FIG. 1A docked in a docking device 115. The docking device 115 is configured to receive the emergency UAV 100, and also configured for passing signals, or power, or both to the emergency UAV 100. The docking device 115 can be fixed to a vehicle, or placed at a fixed location with a power supply as a pre-staged charging station.

Figure 4:
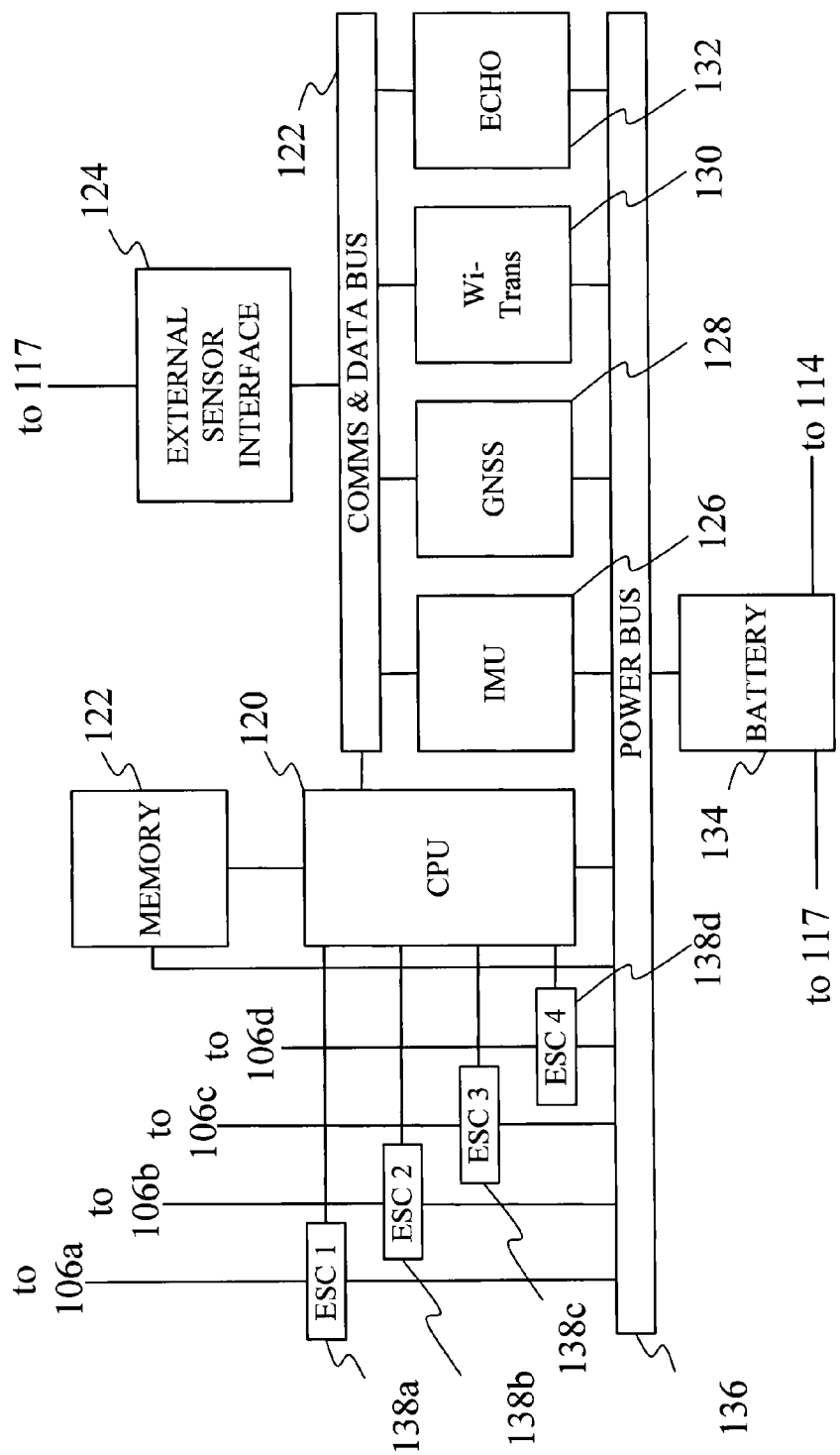
FIG. 4 is a schematic for circuitry in an emergency UAV according to an embodiment of the disclosure.

FIG. 4 illustrates circuitry for the emergency UAV 100 in an embodiment of the disclosure. The circuitry is housed in and protected by the chassis 102. The circuitry includes a processor 120 which performs all the flight, stabilization, and navigation calculations for the emergency UAV 100, and controls the systems of the UAV.

The processor 120 also performs the processes described below. The process data and instructions may be stored in a memory 122, which is a computer-readable medium. The UAV 100 is not limited by the form of the non-transitory computer-readable medium on which the instructions of the inventive process are stored. For example, the instructions may be stored on CDs, DVDs, in FLASH memory, RAM, ROM, PROM, EPROM, EEPROM, hard disk, or any other information processing device with which the processor 120 communicates, such as a server or computer. Further, the functionality may be provided as a utility application, background daemon, or component of an operating system, or combination thereof, executing in conjunction with processor 120 and an operating system such as Microsoft Windows 8, UNIX, Solaris, LINUX, Apple MAC-OS, and other systems known to those skilled in the art.

The hardware elements embodying the processor 120 may be realized by various circuitry elements known to those skilled in the art. For example, the processor 120 may be a Xenon or Core processor from Intel of America or an Opteron processor from AMD of America, or may be other processor types that would be recognized by one of ordinary skill in the art. Alternatively, the processor 120 may be implemented on an FPGA, ASIC, PLD, or using discrete logic circuits, as one of ordinary skill in the art would recognize. Further, the processor 120 may be implemented as multiple processors cooperatively working in parallel to perform the instructions of the inventive processes described below.

The processor 120 is connected to four electronic speed controllers (ESCs) 138. The ESCs 138*a*, 138*b*, 138*c*, and 138*d* are connected to the electric motors 106*a*, 106*b*, 106*c*, and 106*d*, respectively, and provide variable AC power to the electric motors 106. The processor 120 is configured to control the ESCs 138 independently, thereby allowing different power and different speeds for each of the electric motors 106.

A power bus 136 carries power from a battery 134 to the ESCs 138, the processor 120, the memory 122, an inertial measurement unit (IMU) 126, a GNSS receiver 128, a wireless transceiver (Wi-Trans) 130, and a rangefinder interface 132. The battery 134 is a high-capacity battery, for example, a lithium-ion battery or a lithium-ion polymer battery. The battery 134 has connections to solar panel 114 and the external connector 117, and can be recharged via the solar panel 114, or via the external connector 117.

The IMU 126 includes a three-axis accelerometer, a three-axis gyroscope, and a three-axis magnetometer. The IMU 126 may be used by the emergency UAV 100 for navigation in combination with the GNSS receiver 128, or may be used alone for navigation in the event that the GNSS receiver fails to provide a location fix. The IMU 126 can also be used to determine whether the emergency UAV 126 is level, and the angle of tilt if the UAV is not level, as well as a velocity, acceleration, angular velocity, and angular acceleration of the emergency UAV. The data from the IMU 126 can be used by the processor 120 to establish whether certain predetermined conditions exist which would trigger deployment of the emergency UAV 100 have occurred. For example, a predetermined condition could be exceeding a maximum predetermined acceleration as determined by the IMU 126 data, or exceeding a maximum tilt angle as determined from the IMU data.

The GNSS receiver 128 provides position and time information to the emergency UAV 100 via a GNSS. The GNSS can be, for example, the American Global Positioning System (GPS) or the Russian Global Navigation Satellite System (GLONASS), both of which provide global coverage. The system of satellites can also be a regional satellite system, for example, the European Galileo or the Chinese BeiDou-2 systems.

The wireless transceiver 130 is configured to send and receive wireless communications, according to one or more established communication standards. For example, the wireless transceiver 130 can be configured according to the GSM standard, one of the CDMA-based Interim Standards, UMTS, or LTE. The wireless transceiver 130 is also configured for direct communications, for example, with other emergency UAVs in a cooperative mode, and with a vehicle. This allows the emergency UAV 100 to communicate directly with a vehicle or another cooperative UAV within a communications range, without an intermediate communications network.

The rangefinder interface 132 controls the ultrasonic rangefinder 116. The rangefinder interface 132 causes the ultrasonic rangefinder 116 to emit sound wave pulses, receives the output voltage signal corresponding to the reflected pulse, and calculates an altitude of the UAV 100 from the output signal from the ultrasonic rangefinder 116.

A communications and data bus 122 carries all data and communications as required between the processor 120, the IMU 126, GNSS receiver 128, wireless transceiver 130, and rangefinder interface 132. The communications and data bus 122 also links an external sensor interface 124 to the processor 120.

The external sensor interface 124 forms the processing interface between the emergency UAV 100 and any signals received from external sensors via the external connector 117. Due to the size, weight, and power limitation inherent in UAVs, the emergency UAV 100 is limited in the number and type of on-board sensors which can be carried. This limits the predetermined conditions which can be set to deploy the emergency UAV if the predetermined conditions are limited to sensors installed on the emergency UAV. The external sensor interface 124 allows flexibility in the number and types of predetermined conditions which can be monitored, due to the ability of an external vehicle to monitor many different types of conditions with appropriate sensors, and pass the sensor data to the emergency UAV 100 for monitoring via the external sensor interface 124.

The external sensors can be used by the processor 120 to establish whether certain predetermined conditions exist which would trigger deployment of the emergency UAV 100, using data from the external sensors. For example, a predetermined condition for an emergency UAV 100 interfaced to an electrical vehicle can be a battery charge of the vehicle falling below a threshold level, a predetermined condition for an emergency UAV 100 interface to a gasoline or diesel vehicle can be a fuel level falling below a threshold level, and the like. The emergency UAV 100 can also use data from external accelerometers, thermometers, etc., via the external sensor interface 124 to detect whether a number of other predetermined conditions exist which can trigger deployment. The particular sensors connected to via the external sensor interface 124 are not limited to the sensors listed above, but rather could be any sensor which one of ordinary skill in the art could employ to monitor a state for which it is desired that the emergency UAV 100 deploy when a predetermined condition is reached.

Figure 5:
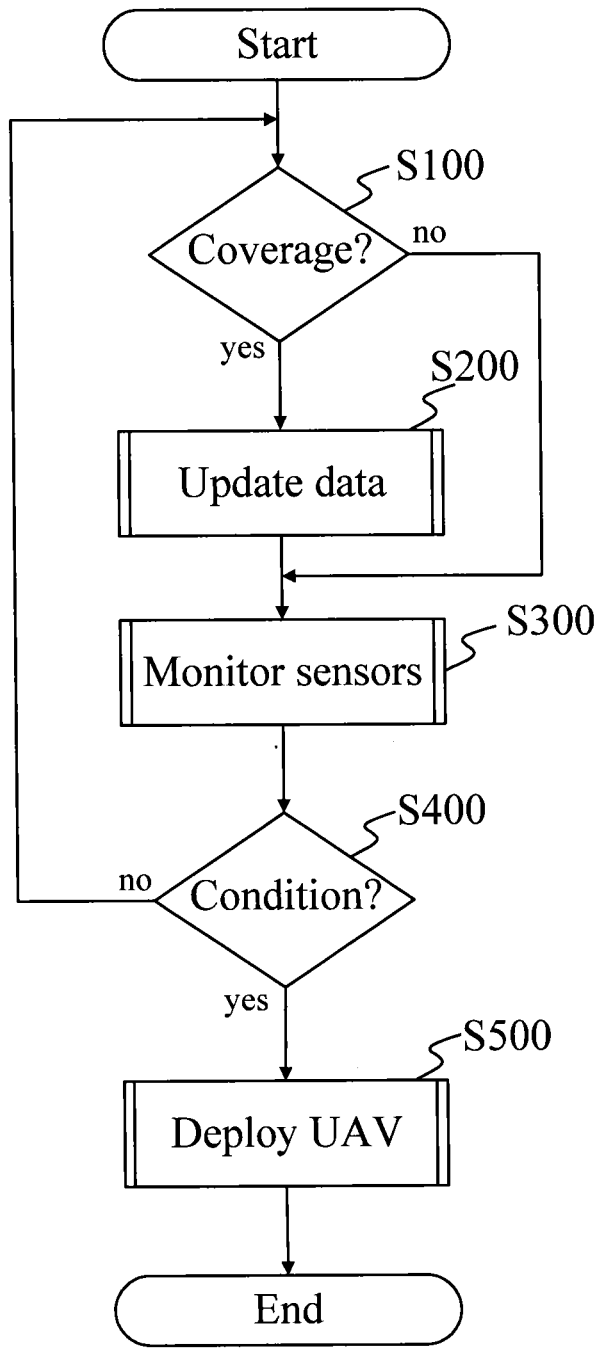
FIG. 5 is a flowchart depicting an algorithm for deploying an emergency UAV according to an embodiment of the disclosure.

FIG. 5 is a flowchart depicting an algorithm for employing an emergency UAV in an embodiment of the disclosure. The algorithm begins at step S100, where the processor 120 determines whether the emergency UAV is currently in an area having wireless coverage via the wireless transceiver 130. If the processor 120 determines that there is communication network coverage, then the processor continues to step S200. If the processor 120 determines that there is not communication network coverage, then the processor continues to step S300.

At step S200, the processor 120 uses the wireless transceiver 130 to establish an connection via the communication network covering the area of the emergency UAV. The processor 120 uses a current location of the emergency UAV 100 determined via the GNSS receiver 128, and updates data as required regarding an area of predetermined size surrounding the current location of the emergency UAV. The data updated includes a digital map having elevation data, weather data, charging stations, and the locations of communication networks, for example. This step is described in greater detail below.

At step S300, the processor 120 monitors one or more sensors corresponding to the predetermined conditions which trigger the deployment of the emergency UAV 100. The processor monitors data from the one or more sensors. The sensors can be incorporated in the emergency UAV 100, such as the IMU 126, or the sensors can be external to the emergency UAV and the data received by the processor 120 via the external sensor interface 124. This step is described in greater detail below.

At step S400, the processor 120 determines whether any of the predetermined conditions which trigger the deployment of the emergency UAV have been met. A predetermined condition for each sensor, defined on the data from the respective sensor, causes the processor 120 to deploy the UAV. The processor 120 determines whether any of the set of predetermined conditions has been met using the data from the one or more sensors. The processor 120 is programmed deploy if any of a set of predetermined conditions is met. If none of the predetermined conditions have been met, then the processor 120 returns to step S100. If one or more of the predetermined conditions have been met, then the processor 120 proceeds to step S500.

For example, a predetermined condition for an emergency UAV 100 interfaced to an electric vehicle could be a battery charge of the vehicle falling below a threshold level, where the electric vehicle is configured to monitor the battery charge and send this information to the UAV 100 via the external sensor interface 124. A predetermined condition for an emergency UAV 100 interfaced to a gasoline or diesel vehicle could be a fuel level falling below a threshold level, where the vehicle is configured to monitor the fuel level and send this information to the UAV 100 via the external sensor interface 124. The emergency UAV 100 could also use accelerometers, thermometers, etc., via the external sensor interface 124 to detect whether a number of other predetermined conditions exist which can trigger deployment.

As another example, a predetermined condition can be the receipt by the emergency UAV 100 via the wireless transceiver 130 of a distress message from another emergency UAV.

The emergency UAV 100 deploys at step S500. When the emergency UAV deploys, the processor 120 causes the UAV to become airborne. The processor 120 uses a current location of the UAV determined via the GNSS receiver 128, and the most current map stored in memory. The map includes elevation data, restricted aviation areas, charges stations, meteorological data, and the like, georeferenced to the map. The processor calculates an optimal path from the current location of the UAV to a communication network, and then causes the UAV to move along the path until an area wireless communication is available. Once an area of wireless service is reached, a distress message is broadcast. This step is described in greater detail below.

This completes the algorithm for employing the emergency UAV 100.

Figure 6:
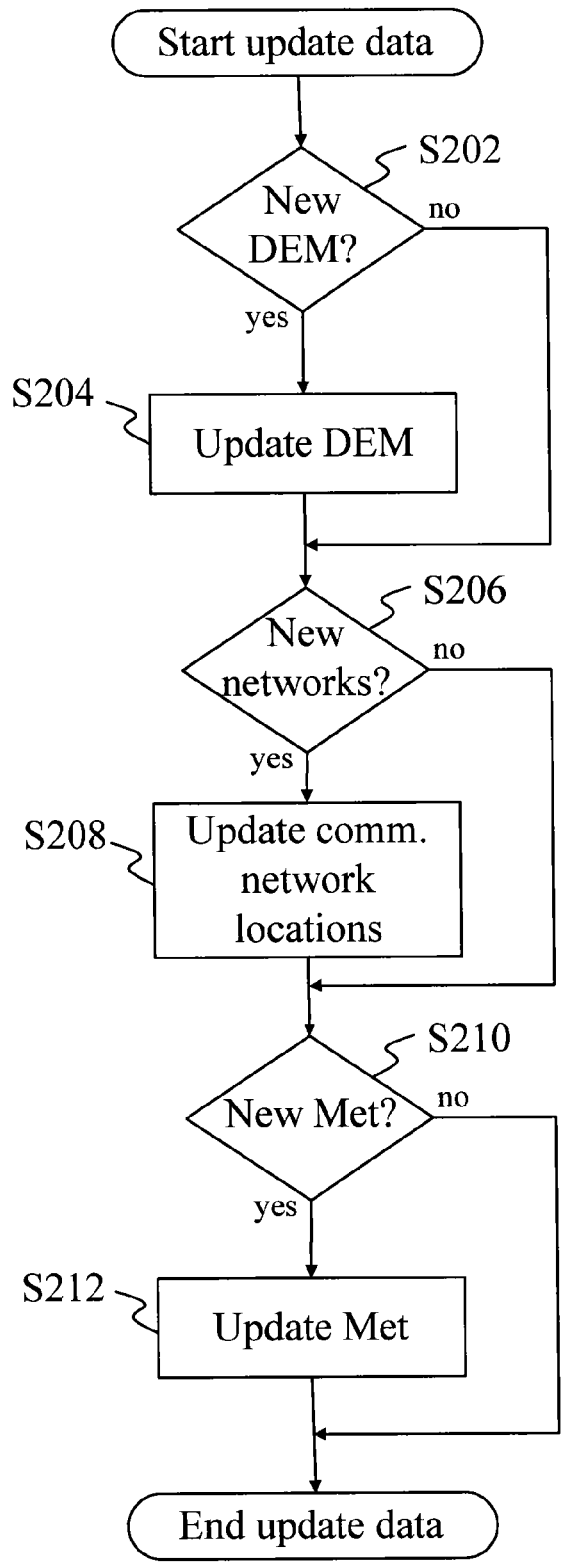
FIG. 6 is a flowchart depicting an algorithm for updating data in an emergency UAV according to an embodiment of the disclosure.

FIG. 6 is a flowchart depicting a method for updating data in an emergency UAV in an embodiment of the disclosure. The processor 120 stores a digital georeferenced map in memory 122. Associated data is georeferenced to locate the associated data on the map. The processor 120 periodically updates the associated data. In the event that the emergency UAV is deployed, the processor 120 will have data corresponding to the surrounding area.

At step S202, the processor 120 determines whether a new digital elevation map (DEM) is required. A DEM is a georeferenced terrain elevation map. The DEM can also include information about locations associated with the map, such as the locations of charging stations or areas in which flight has been restricted by civil aviation authorities, such as the Federal Aviation Administration (FAA) in the United States of America or the General Authority of Civil Aviation (GACA) in the Kingdom of Saudi Arabia.

The processor 120 uses the wireless transceiver 130 to establish a connection via the communication network covering the area of the emergency UAV 100. The processor 120 compares a location of the UAV 100, determined either via the GNSS receiver 128 or via the wireless transceiver 130 and the communication network, to a current DEM stored in the memory 122. If the processor 120 determines that the location of the UAV 100 is not within the DEM, or is within a predetermined distance of an edge of the DEM, then the processor determines that new DEM information is required and proceeds to step S204. If the processor determines that no new DEM information is required, then the processor proceeds to step S206.

At step S204, the processor updates the DEM. There are several publicly available sources for coarse DEMs which can be accessed via the connection established using the wireless transceiver 130 and the communication network covering the area of the emergency UAV 100. As one example, the Shuttle Radar Topography Mission (SRTM) DEMs are available from the US Geological Survey (USGS) website in multiple resolutions. The SRTM30 DEM files each cover a geographic area on the Earth's surface of approximately 50 degrees latitude by 40 degrees longitude, at a resolution of approximately 1 square kilometer.

At step S206, the processor 120 determines whether there are any new communication network locations on the map. The processor 120 uses the connection established via the wireless transceiver 130.

Using a web application programming interface (API) or client application, either through a free service or a pay service, georeferenced locations of communication networks can be obtained in an area surrounding the emergency UAV. Georeferenced locations of communication networks may also be downloaded as files from publicly available websites. As one example, the OpenCellID collaborative project offers all these services. A service or website could also be established for use by the emergency UAV, and accessed via a web API or client application, or another method available to one of ordinary skill in the art to determine georeferenced communication network locations can be used.

If the processor determines at step S206 if that there are new communication network locations on the map stored in memory 122, then at step S208 the processor 120 stores the new georeferenced communication network locations in the memory 122, and proceeds to step S210. If the processor 120 determines at step S206 that there are no new communication network locations on the map, then the processor proceeds directly to step S210.

At step S210, the processor 120 determines whether there is any new meteorological data on the map. The processor 120 again uses the connection established via the wireless transceiver 130.

Using a web API or client application, georeferenced meteorological data can be obtained either through a free service or a pay service. As one example, the API by OpenWeatherMap allows queries for real-time georeferenced meteorological information. Examples of meteorological data which may be georeferenced include severe weather areas, temperature, and wind speed and direction. A service or website could also be established for use by the emergency UAV, and accessed via a web API or client application, or another method available to one of ordinary skill in the art to determine georeferenced meteorological data can be used.

If the processor determines at step S210 if that there is new meteorological data on the map, then at step S212 the processor 120 stores the new georeferenced meteorological data in the memory 122.

This completes the algorithm for updating the data stored in the emergency UAV 100.

Figure 7:
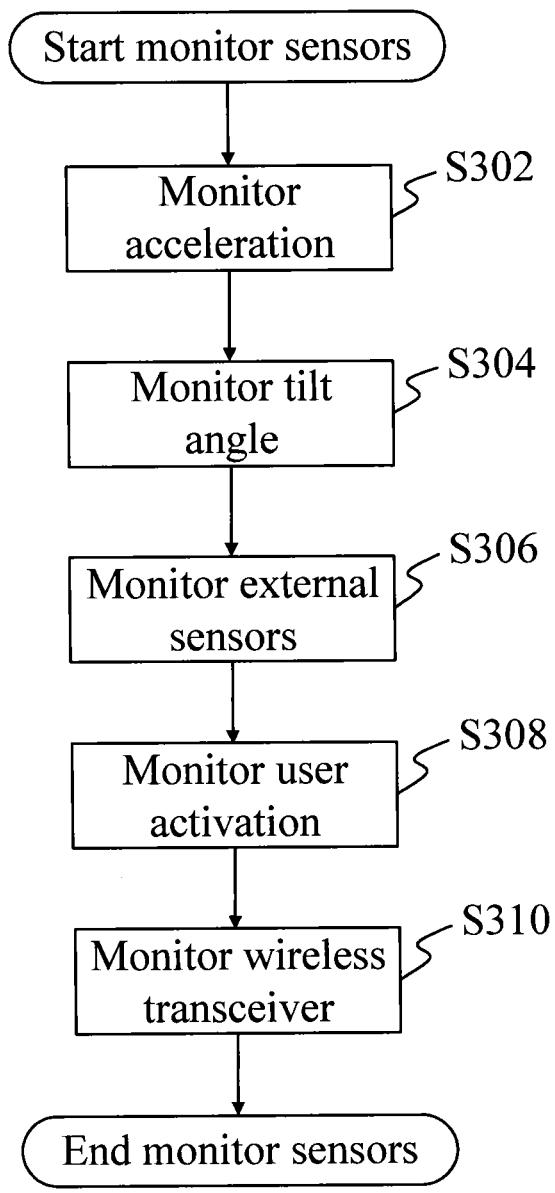
FIG. 7 is a flowchart depicting an algorithm for monitoring sensors in an emergency UAV according to an embodiment of the disclosure.

FIG. 7 is a flowchart depicting an algorithm for monitoring sensors in an emergency UAV in an embodiment of the disclosure. This method is periodically carried out before a deployment of the emergency UAV.

The algorithm begins at step S302 with the processor 120 processing acceleration data from the IMU 126 to determine an acceleration of the UAV 100. The IMU 126 outputs include data corresponding to acceleration values about three independent axes. The processor 120 combines the data to calculate a total acceleration of the emergency UAV, which is monitored to determine whether a predetermined maximum allowable acceleration has been experienced.

At step S304, the processor 120 determines a tilt relative to horizontal of the UAV 100 by processing angular acceleration data from the IMU 126. The IMU 126 outputs also include data corresponding to angular acceleration values about three independent axes. The processor 120 integrates the data to calculate angular velocities of the emergency UAV and then angular positions, which are monitored to determine whether a predetermined maximum allowable angular tilt has been experienced.

At step S306, the processor 120 processes the data from any external sensors via the external sensor interface 124. The external sensors are used to establish whether certain predetermined conditions exist which would trigger deployment of the emergency UAV 100, where the data to determine whether the predetermined conditions have been met come from sensors external to the UAV 100. If there are no external sensors providing data to the emergency UAV 100 via the external sensor interface 124, then this step is not performed.

At step S308, the processor monitors the manual deployment button 111 to determine whether the UAV 100 has been manually deployed. The manual deployment button 111 activation allows user deployment of the emergency UAV 100 without one of the other predetermined conditions being met.

At step S310, the processor 120 monitors the wireless transceiver for a signal from a cooperative emergency UAV. Since the wireless transceiver 130 is configured for direct communication between emergency UAVs, the processor 120 is able to receive a request for assistance from another emergency UAV without having communication network coverage.

This completes the algorithm for monitoring sensors. The result is that the processor 120 monitors every means of deploying the emergency UAV 100 while the UAV is not deployed.

Figure 8A:
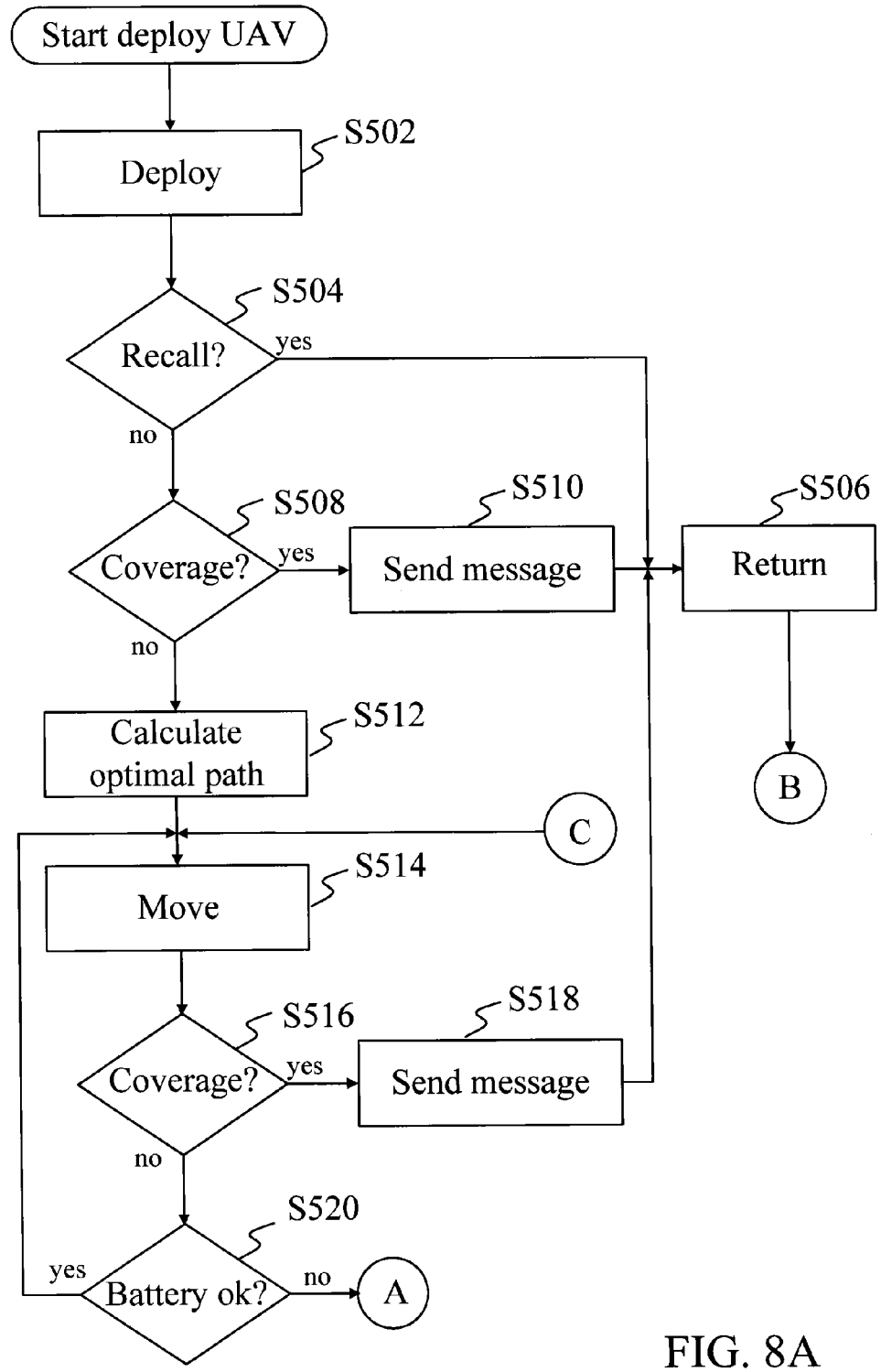
FIG. 8A is a flowchart depicting an algorithm for deploying an emergency UAV according to an embodiment of the disclosure.

FIG. 8A is a flowchart for an algorithm for deploying an emergency UAV in an embodiment of the disclosure. At step S502, the emergency UAV 100 deploys by becoming airborne and flying to a predetermined altitude AGL. The emergency UAV 100 determines a deployment location using the GNSS receiver 128. The emergency UAV hovers for a predetermined period of time, during which a recall signal can be received via the wireless transceiver 130 which will cause the UAV to return to the location from which the UAV was deployed.

At step S504, the processor 120 determines whether a recall signal has been received during the predetermined period of time. If a recall signal is received, the processor 120 does not send a distress signal and continues to step S506. If no recall signal is received, the processor continues to step S508.

At step S506, the emergency UAV 100 has received the recall signal and moves to a stand-by location. The stand-by location can be, for example, the location from which the UAV was deployed, a fixed stand-off distance in a vicinity of the location from which the UAV was deployed, a predetermined stand-by position, and the like.

At step S508, the processor 120 determines whether the UAV 100 is in an area of communication network coverage via the wireless transceiver 130. If the processor 120 determines that the UAV 100 is in an area of communication network coverage, then at step S510 the processor sends a distress message via the wireless transceiver 130. The distress message includes position information corresponding to a location where the UAV was deployed. Due to the increased line-of-sight range of the UAV 100, the UAV may have wireless communications at the predetermined height AGL even while no wireless communication is possible on the ground. After sending the message, the processor 120 proceeds to step S506, where the UAV 100 returns to the location from which it was deployed. If at step S508 the processor 120 determines that the UAV 100 is not in an area having communication network coverage, then the processor proceeds to step S512.

At step S512, the processor calculates an optimal path to an area having communication network coverage. The optimal path calculation takes as inputs the locations of the communication networks stored in memory 122, any locations of charging stations stored in memory 122, the variation in elevation as stored in the DEM stored in memory 122, and the wind speed and direction stored in memory 122.

The wind speed and direction change an airspeed of the emergency UAV, yielding a speed over ground of the emergency UAV which is different from an air speed of the UAV. The known airspeed of the emergency UAV 100 is combined with the wind speed and direction to produce the speed over ground of the UAV.

The deployment location of the emergency UAV, restricted aviation areas, the locations of any charging stations, the locations of the communication networks, and the elevations from the DEM are used with the speed over ground of the emergency UAV to calculate the optimal path to a communication network, the optimal path being the path taking the shortest time to traverse, and not necessarily the shortest path. Calculation of the optimal path is a routine optimization problem which can be accomplished using one of the optimal path algorithms known to those of ordinary skill in the art, for example, Dijkstra's algorithm or the A* algorithm.

At step S514, the processor causes the emergency UAV to move along the optimal path calculated in step S512.

At step S516, the processor 120 determines whether the UAV 100 is in an area of communication network coverage via the wireless transceiver 130. If the processor 120 determines that the UAV 100 is in an area of communication network coverage, then at step S518 the processor sends a distress message via the wireless transceiver 130. The distress message includes position information corresponding to a location where the UAV was deployed. The distress message may be sent, for example, to a dedicated dispatcher or service for the emergency UAV 100, or to a national emergency service, such as 911 in the United States of America or 997 in the Kingdom of Saudi Arabia.

After sending the message, the processor 120 returns to step S506, and the UAV 100 returns to the stand-by location. If at step S516 the processor 120 determines that the UAV 100 is not in an area having communication network coverage, then the processor proceeds to step S520.

At step S520, the processor 120 determines a state of charge of the battery 134. If the state of charge of the battery 134 is determined to be above a predetermined level, then the processor returns to step S514. If the state of charge of the battery 134 is determined to not be above the predetermined level, then the processor continues to step S522.

Figure 8B:
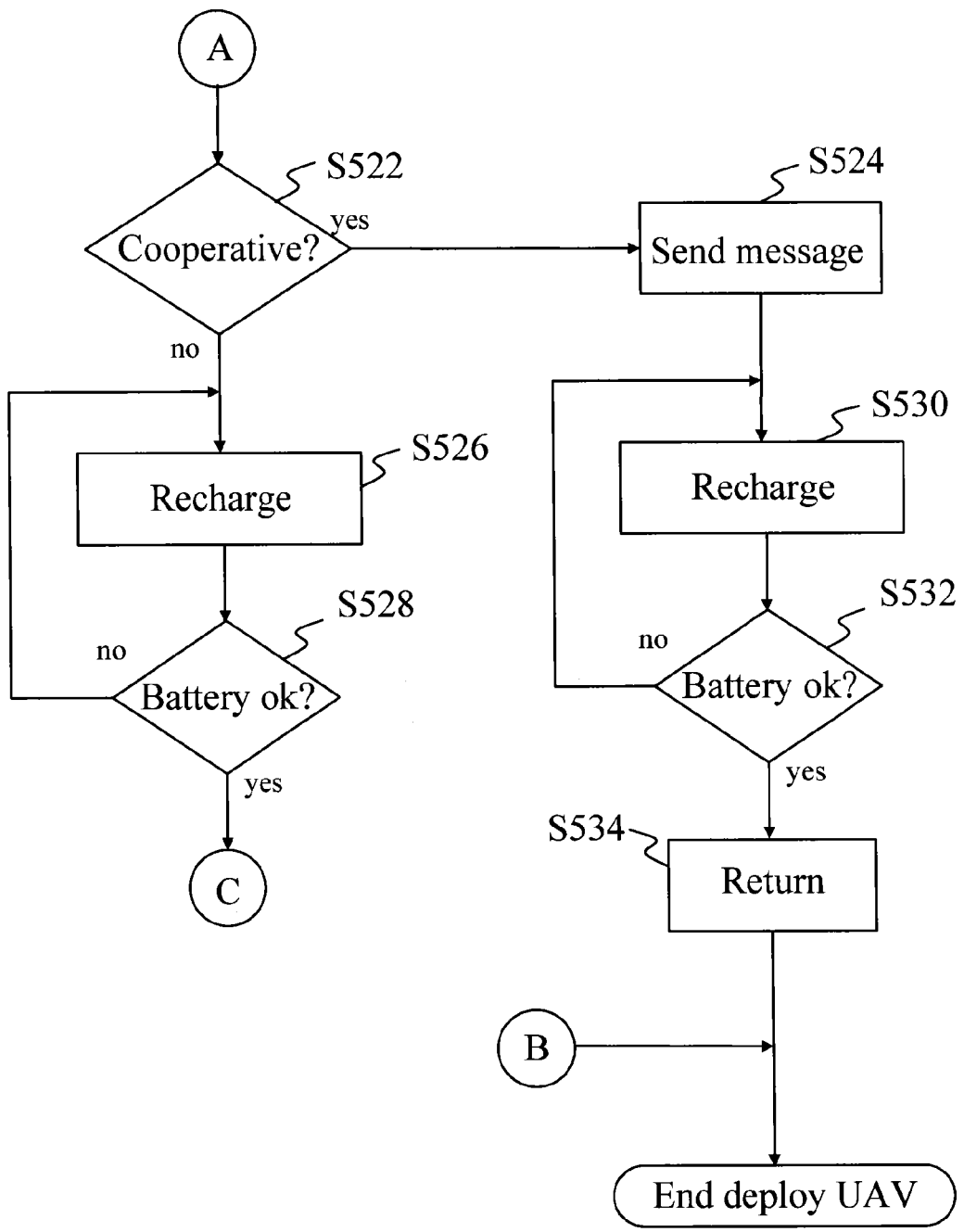
FIG. 8B is a continuation of the flowchart depicting the algorithm for deploying an emergency UAV in FIG. 8A.

FIG. 8B is a continuation of the flowchart for the algorithm for deploying an emergency UAV in FIG. 8A. At step S522, the processor 120 broadcasts a signal via the wireless transceiver 130 to determine if there is another cooperative UAV within a communications range of the emergency UAV 100.

If at step S522 the processor 120 determines that there is no cooperative UAV available, then at step S526 the processor causes the emergency UAV 100 to land. The processor 120 uses the ultrasonic rangefinder 116 and the rangefinder interface (ECHO) 132 to determine a distance to the ground, and makes a controlled descent with an appropriate landing speed when the landing skids 118 contact the ground.

The processor recharges the battery 134 via light collected by the solar panel 114. At step S528, the processor 120 monitors the state of charge of the battery 134. If the state of charge of the battery 134 has risen to a predetermined charge, then the processor 120 causes the emergency UAV to become airborne again and returns to step S514. If the state of charge of the battery 134 has not risen to the predetermined charge, then the processor 120 returns to charging at step S526.

If at step S522 the processor 120 determines that there is another cooperative UAV within a communications range of the emergency UAV 100, then at step S524 the processor forwards the distress message to the cooperative UAV. This serves as one of the predetermined conditions which cause the cooperating UAV to deploy.

After the emergency UAV 100 has relayed the distress message at step S524, the state of charge of the battery 134 is still below the predetermined level. At step S530 the processor causes the emergency UAV 100 to land. The processor 120 uses the ultrasonic rangefinder 116 and the rangefinder interface 132 to determine a distance to the ground, and makes a controlled descent with an appropriate landing speed when the landing skids 118 contact the ground.

The processor recharges the battery 134 via light collected by the solar panel 114. At step S532, the processor 120 monitors the state of charge of the battery 134. If the state of charge of the battery 134 has risen to a predetermined charge, then the processor 120 causes the emergency UAV to become airborne again and proceeds to step S534. If the state of charge of the battery 134 has not risen to the predetermined charge, then the processor 120 returns to charging at step S530.

At step S534, processor 120 reverses the optimal path traversed so far, and returns to the location from which it was deployed.

This completes the algorithm for deploying the emergency UAV 100.

While certain embodiments have been described herein, these embodiments are presented by way of example only, and are not intended to limit the scope of the disclosure. Indeed, using the teachings in this disclosure, a person having ordinary skill in the art could modify and adapt the disclosure in a various ways, making omissions, substitutions and changes in the form of the embodiments described herein without departing from the spirit of the disclosure. The accompanying claims and their equivalents are intended to cover such forms or modifications as would fall within the scope and spirit of the disclosure.

I claim:

1. An emergency unmanned aerial vehicle (UAV) comprising:
   a wireless transceiver configured to receive and transmit wireless communications;
   an inertial measurement unit (EMU) configured with at least one of a three-axis accelerometer, a three-axis gyroscope, and a microelectromechanical magnetometer;
   a global navigation satellite system (GNSS) receiver, configured to receive position information via an antenna and determine a position of the UAV; and
   circuitry configured to
      store a digital elevation model (DEM) and associated data, the associated data including locations of communication networks,
      update the locations of communication networks in the associated data via the wireless transceiver,
      store position information determined by the GNSS receiver,
      detect a predetermined condition,
      determine, using at least one of the DEM and the associated data, whether the UAV is within a communications range of any communication network via the wireless transceiver,
      determine a path to a communication network using the DEM and the associated data,
      cause the UAV to become airborne and fly along the path to the communication network in response to detecting the predetermined condition,
      transmit a distress message via the wireless transceiver to the communication network, the distress message including position information corresponding to a location where the UAV detected the predetermined condition,
      determine an acceleration of the UAV via the IMU prior to the UAV becoming airborne,
      wherein the predetermined condition is detected when the determined acceleration exceeds a predetermined acceleration.

2. The emergency UAV as recited in claim 1, further comprising
   a solar panel configured to charge the battery.

3. The emergency UAV as recited in claim 1, wherein the circuitry determines the path to the communication network using an optimal path algorithm.

4. The emergency UAV as recited in claim 1, wherein the circuitry is further configured to
   store and update environmental data via the wireless transceiver, the environmental data being included in the associated data.

5. The emergency UAV as recited in claim 4, wherein the circuitry is further configured to:
   periodically determine whether a communication network is available prior to the UAV becoming airborne, and
   periodically obtain the locations of the communication networks and the environmental data via an available communication network when it is determined that the communication network is available.

6. The emergency UAV as recited in claim 1,
wherein the emergency UAV is configured to couple to a docking station on a vehicle, and
wherein the emergency UAV is configured to charge a battery provided in the UAV from the vehicle when coupled to the docking station on the vehicle.

7. The emergency UAV as recited in claim 6, wherein the circuitry is further configured to
receive sensor information from the vehicle,
wherein detecting the predetermined condition includes detecting the predetermined condition in the received sensor information from the vehicle.

8. The emergency UAV as recited in claim 7, wherein the sensor information from the vehicle includes at least one of a fuel level of the vehicle, a battery charge state of the vehicle, and a tilt angle of the vehicle.

9. The emergency UAV as recited in claim 1,
wherein the associated data includes locations of charging stations, and
wherein the emergency UAV is configured to couple to a charging station and receive charge from the charging station.

10. The emergency UAV as recited in claim 1, wherein the circuitry is further configured to:
cause the emergency UAV to wait a predetermined period of time after detecting the predetermined condition before causing the UAV to fly along the path to the communication network or transmitting the distress message,
receive a signal canceling the detection of the predetermined condition via the wireless transceiver within the predetermined period of time, and
cause the emergency UAV to return to a stand-by location when the signal canceling the activation is received within the predetermined period of time.

11. The emergency UAV as recited in claim 1, wherein the emergency UAV is configured to be folded and stored in a portable pack.

12. The emergency UAV as recited in claim 1, wherein the wireless transceiver is further configured as a multiband transceiver including direct radio communications capability.

13. The emergency UAV as recited in claim 1, further comprising
an Ultrasonic rangefinder,
wherein the circuitry is configured to land the UAV when a charge of the battery decreases to a predetermined threshold charge after the UAV becomes airborne,
wherein the circuitry uses the ultrasonic rangefinder to verify a distance to the ground, and
wherein the circuitry monitors a charge of the battery, and reactivates the UAV when the battery reaches a predetermined charge level.

14. The emergency UAV as recited in claim 1,
wherein the DEM and associated data indicate geographical regions where the UAV is not allowed to fly, and
wherein the circuitry determines the path to the communication network avoiding the indicated regions where the UAV is not allowed to fly.

15. The emergency UAV as recited in 1, wherein the circuitry is further configured to transmit the distress message via the wireless transceiver to a second emergency UAV.

16. The emergency UAV as recited in claim 15, wherein the circuitry is further configured to receive an external distress message via the wireless transceiver prior to the UAV becoming airborne,
wherein the detecting the predetermined condition includes receiving the external distress message via the wireless transceiver.

17. The emergency UAV as recited in claim 1, wherein the circuitry is further configured to
cause the emergency UAV to return to a stand-by location after the UAV transmits the distress message to the communication network,
wherein the stand-by location is a pre-programmed location or the stand-by location is a location where the UAV became airborne.

18. A method for employing an emergency unmanned aerial vehicle (UAV) comprising:
storing a digital elevation model (DEM) and associated data, the associated data including locations of communication networks in on-board circuitry including a memory;
updating the locations of communication networks in the associated data to the DEM via a wireless transceiver configured to receive and transmit wireless communications;
storing position information determined by a global navigation satellite system (GNSS) receiver, configured to receive position information via an antenna and determine a position of the UAV;
detecting a predetermined condition using electronic sensors;
determining whether the UAV is within a communications range of any communication network via the wireless transceiver;
determining a path to a communication network using the DEM and the associated data,
causing the UAV to become airborne and fly along the path to the communication network in response to detecting the predetermined condition, and
transmitting a distress message via the wireless transceiver to the communication network, the distress message including position information corresponding to a location where the UAV detected the predetermined condition,
determining an acceleration of the UAV, via an inertial measurement unit (IMU) configured with at least one of a three-axis accelerometer, a three-axis gyroscope, and a microelectromechanical magnetometer, prior to the UAV becoming airborne,
wherein the predetermined condition is detected when the determined acceleration exceeds a predetermined acceleration.

19. A non-transitory computer readable medium having program instructions stored therein for causing a processor to perform a method for employing an emergency unmanned aerial vehicle (UAV), the method comprising:
storing a digital elevation model (DEM) and associated data, the associated data including locations of communication networks in a memory;
updating the locations of communication networks in the associated data to the DEM via a wireless transceiver configured to receive and transmit wireless communications;
storing position information determined by a global navigation satellite system (GNSS) receiver, the GNSS configured to receive position information via an antenna and determine a position of the UAV;

detecting a predetermined condition via electronic sensors;
determining whether the UAV is within a communications range of any communication network via the wireless transceiver;
determining a path to a communication network using the DEM and the associated data;
causing the UAV to become airborne and fly along the path to the communication network in response to detecting the predetermined condition; and
transmitting a distress message via the wireless transceiver to the communication network, the distress message including position information corresponding to a location where the UAV detected the predetermined condition,
determining an acceleration of the UAV, via an inertial measurement unit (IMU) configured with at least one of a three-axis accelerometer, a three-axis gyroscope, and a microelectromechanical magnetometer, prior to the UAV becoming airborne,
wherein the predetermined condition is detected when the determined acceleration exceeds a predetermined acceleration.

* * * * *